Dec. 16, 1924.  1,519,164
B. S. PFEIFFER
TRACTOR
Filed June 12, 1920   2 Sheets-Sheet 1
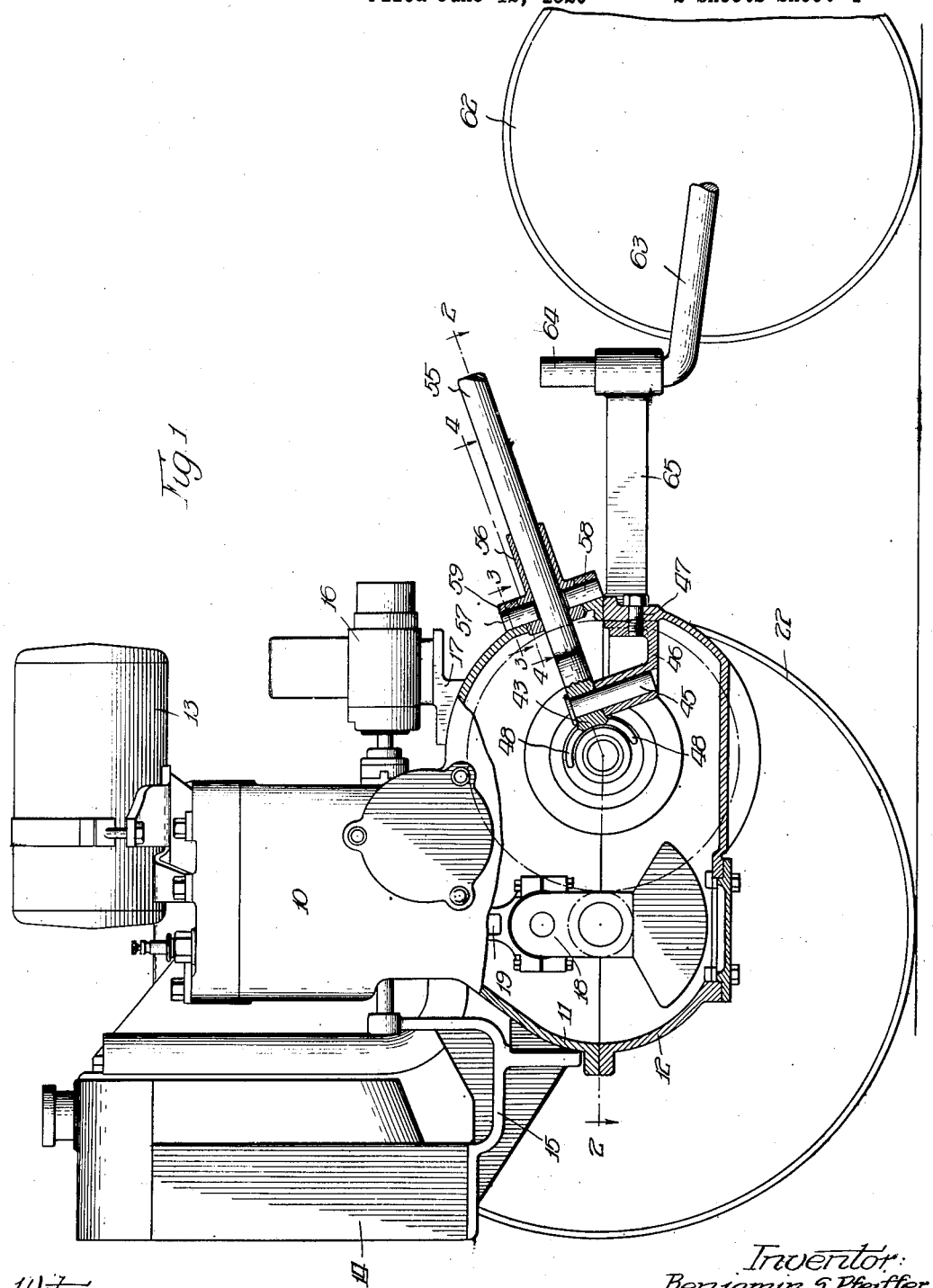
Witness:
R Burkhardt
Inventor:
Benjamin S. Pfeiffer
By Chas. L. Byron
atty.

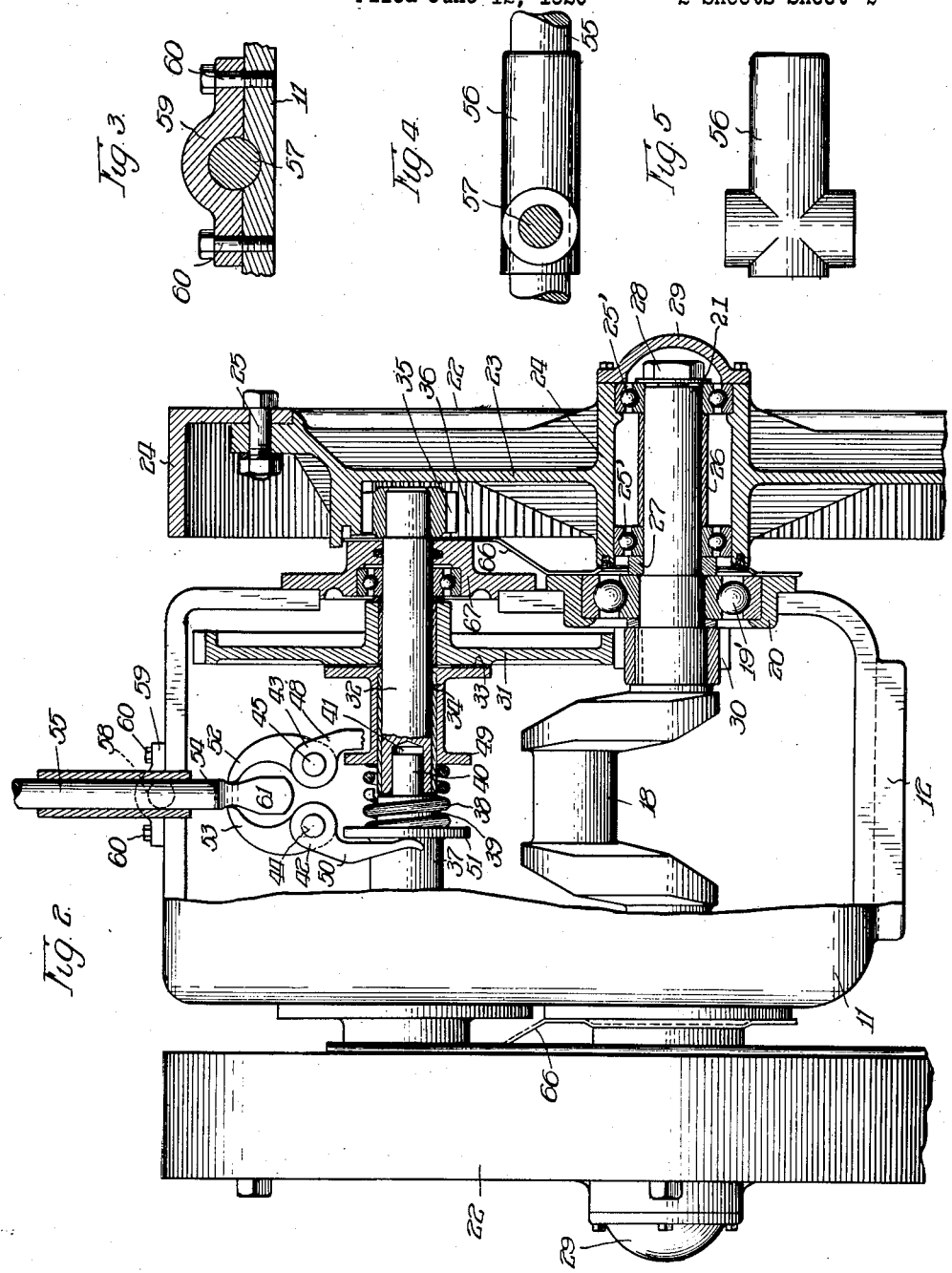

Patented Dec. 16, 1924.

1,519,164

UNITED STATES PATENT OFFICE.

BENJAMIN S. PFEIFFER, OF WINNETKA, ILLINOIS.

TRACTOR.

Application filed June 12, 1920. Serial No. 388,481.

*To all whom it may concern:*

Be it known that I, BENJAMIN S. PFEIFFER, a citizen of the United States, residing at Winnetka, in the county of Cook and State of Illinois, have invented certain new and useful Improvements in Tractors, of which the following is a specification.

This invention relates to tractors, and particularly to a relatively small type of tractor for garden use.

One object of this invention is to provide a tractor for garden use which is light, compact, narrow in width and simple in construction, operation and control.

Another object is to provide a relatively simple, inexpensive and efficient garden tractor adapted to meet the various requirements for successful use.

These and other objects are accomplished by means of the arrangement disclosed on the accompanying sheets of drawings, in which—

Figure 1 is a side elevation, parts being in section, of a garden tractor embodying my invention;

Figures 2, 3 and 4 are views taken in the planes of lines 2—2, 3—3 and 4—4, respectively, of Figure 1, Figures 3 and 4 being enlarged views; and, Figure 5 is an enlarged side elevation of the tubular T-shaped pivot member taken at right angles to the view shown in Figure 4.

The various novel features of the invention will be apparent from the following description and drawings and will be particularly pointed out in the appended claims.

Referring to the figures of the drawings, it will be noted that my tractor includes an engine 10 having a crank case preferably divided into two parts 11 and 12 in a horizontal plane for making parts of the engine and gearing therein readily accessible and making it possible to readily assemble and disassemble the tractor. A fuel supply tank 13 is mounted on top of the engine and a water cooling radiator 14 supported by a bracket 15 is carried by and at the front of the engine. A magneto 16 is carried by a bracket 17 at the rear of the engine.

Mounted in the crank case is a crank shaft 18 operatively connected to the engine piston (not shown) in the usual manner by a connecting rod 19. This crank shaft 18 is rotatably mounted in crank shaft bearings 19' carried in a bearing housing 20 inserted into an opening in each side of the crank case along the line of division of the latter. Opposite ends of the crank shaft extend outwardly through the oppositely arranged bearing housings and sides of the crank case, forming axle portions 21 for the traction wheels 22. Each of the traction wheels preferably includes a spider portion 23 and a ground-engaging portion 24, the latter being secured to the former by any suitable fastening means 25. Interposed between the hub 24 of each wheel and its associated axle 21 are two sets of wheel bearings 25' which preferably are in the form of ball bearings, the members of each set of ball bearings being spaced along the axle by a spacer 26, and the inner ball bearing member being spaced from the crank shaft bearings 19 by another spacer 27. Each wheel is rotatably secured on the axle portions 21 by a suitable washer and nut arrangement 28 which acts through the outer wheel bearing members 25'. A cap 29 is secured to the hub 24 for preventing the admission of foreign material and keeping the parts therein clean.

Keyed to the crank shaft to the inside of the crank shaft bearings 19' and within the crank casing at each side of the machine is a pinion 30 meshing with and driving a relatively large gear 31 loosely mounted upon a power transmitting or control shaft 32. This gear wheel 31 has a friction or clutch surface 33 adapted to be engaged by a cooperating friction surface of a clutch member 34 splined to the shaft 32. It is apparent, therefore, that when the clutch member 34 is in operative engagement with the gear wheel 31, motion will be transmitted from the crank shaft 18 through pinion 30, gear 31, clutch 34, shaft 32 to a gear 35 mounted at one end of the shaft 32, which gear 35 meshes with an internal gear 36 formed on the wheel spider 23 for propelling the wheel 22 on the right-hand side, as viewed in Figure 2. Similarly, the left-hand wheel may be driven by duplicate mechanism on the left-hand side of the tractor. It will be noted that the oppositely arranged clutch members 34 and 37 normally are pressed outwardly or away from each other into clutching engagement with respect to their gears by a single coiled spring 38 interposed between flanges 49 and 51 on said clutch members. The left-hand drive shaft 39 has a reduced portion 40 which extends into a bearing portion 41 in its associated control or drive shaft 32 for assisting in maintaining the alignment of said shafts.

In connection with the control of the machine, as stated above, under normal running conditions the clutch members 34 and 37 are held in a driving position by the single coiled spring 38. To turn the tractor one way or the other, one of these clutch members is withdrawn from its operative position and when it is desired to stop the tractor, both clutch members are withdrawn from operative position by control mechanism, including oppositely arranged members 42 and 43 pivotally mounted by means of pins 44 and 45, respectively, carried by a bracket 46 secured within and to the lower half 12 of the crank case at the rear thereof by any suitable means. The pivotally mounted member 43 has arms 48 which embrace clutch member 34 and engage the flange 49 thereof. Similarly, the clutch member 42 has arms 50 which embrace the clutch member 37 and engage the flange 51 thereof. The member 43 has a horn portion 52 and member 42 has a horn portion 53, both of which under normal operating conditions engage a reduced portion 54 of a control lever 55 which, as will be pointed out later, has a longitudinal sliding or reciprocating motion and also a pivotal motion. As shown in Figure 2 of the drawings, the control member 55 is in a position to permit the spring 38 to throw the clutch members 34 and 37 into operative position whereby the tractor may be propelled through the gearing connections hereinabove described. If it were desired to turn the tractor in one direction or the other, the control lever 55 would be given a pivotal movement. At this point it will be noted that the control lever 55 is slidably mounted in a T-shaped tubular pivot member 56 having oppositely arranged hollow portions for receiving pivot pins 57 and 58, said pins also extending into cooperating openings in the upper and lower crank case members 11 and 12 and being secured in position by a cap 59 fastened to the crank case by studs 60 and best shown in Figure 3 of the drawings. It is apparent, therefore, that the control lever 55 may be swung about the pins 57 and 58 as a pivot. Referring now particularly to Figure 2, it will be seen that if the outer end of lever 55 is swung to the left, the inner end will be swung to the right, causing the clutch member 34 to be thrown into an inoperative position and thereby preventing further driving power to be transmitted to the wheel shown at the right in Figure 2, in which case the traction wheel at the left still receiving power would cause the tractor to be turned in one direction. In a similar manner the tractor may be turned in the opposite direction by an opposite movement of the control lever 55. When it is desired to stop the tractor without stopping the engine, the same may be accomplished by drawing the control lever 55 outwardly, whereby the enlarged inner end 61 will move into engagement with the horn portions 52 and 53 of the pivotal members 43 and 42, respectively, for drawing both of the clutch members 34 and 37 inwardly and out of operative engagement with their associated gears, preventing driving power to be transmitted to the traction wheels 22.

Preferably this tractor is of the two-wheeled type, there being a trailer or balancing wheel 62 at the rear having a rod 63 with an upturned portion 64 pivoted in one end of a bracket 65 which may be secured to or may form an integral part of the lower crank case member 12. To be effective for garden use, this tractor necessarily must be narrow. I have made this possible by setting the crank case bearings within the crank case and by using extensions of the crank shaft as axles for the traction wheels. A dust protector 66 is preferably secured between the bearing housings 20 and 67 and portions of each wheel 22 for preventing dust or other foreign material from passing into engagement with the interior running parts. By means of the control arrangement hereinabove described, the tractor is readily and simply controlled and all parts of the tractor, which are relatively few in number, are readily accessible and may be assembled and disassembled in a minimum amount of time, the tractor generally being light and compact and adapted to meet the various requirements for the particular use.

It is my intention to cover all modifications of the invention falling within the spirit and scope of the following claims.

I claim:

1. In a tractor, the combination of an engine having a crank case, a crank shaft rotatably mounted therein and having portions extending outwardly therefrom, and traction wheels rotatably mounted on the outwardly extending portions of said crank shaft, the latter serving as axles for said traction wheels.

2. In a tractor, the combination of an engine having a crank case, a crank shaft mounted therein and having a portion extending outwardly therefrom, and a traction member mounted on the outwardly extending portion of said crank shaft, the latter serving as an axle for said traction wheel.

3. In a tractor, the combination of an engine having a crank case, a crank shaft mounted therein and having a portion extending outwardly therefrom, a traction member mounted on the outwardly extending portion of said crank shaft, the latter serving as an axle for said traction member, and a driving connection between said crank shaft and said traction member.

4. In a tractor, the combination of an engine having a crank case, a bearing inserted therein, a crank shaft rotatably mounted in said bearing and having a portion extending outwardly from said case, and a traction wheel mounted on the outwardly extending portion of said crank shaft, the latter serving as an axle for said traction wheel.

5. In a tractor, the combination of an engine having a crank case, a crank shaft mounted therein and having a portion extending outwardly therefrom, a traction wheel mounted on the outwardly extending portion of said crank shaft, the latter serving as an axle for said traction wheel, a gearing connection between said crank shaft and traction wheel, and control means carried by said crank case for controlling an operative movement of said tractor.

6. In a tractor, the combination of an engine having a crank case, a crank shaft rotatably mounted therein and having portions extending outwardly therefrom, traction wheels rotatably mounted on the outwardly extending portions of said crank shaft, the latter serving as axles for said traction wheels, a gearing connection between said crank shaft and traction wheels, and control means whereby driving power may be controlled to either or both of said traction wheels for propelling and turning the tractor.

7. In a tractor, the combination of an engine having a crank case, a crank shaft rotatably mounted therein and having portions extending outwardly therefrom, traction wheels rotatably mounted on the outwardly extending portions of said crank shaft, the latter serving as axles for said traction wheels, a gearing connection between said crank shaft and traction wheels, and control means whereby driving power may be controlled to either or both of said traction wheels for propelling and turning the tractor, said control means including a control member given a pivotal movement for one control operation and an axial sliding movement for another control operation.

8. In a tractor, a driven shaft, a pair of traction wheels, a clutch for each wheel adapted to operatively connect it to the driven shaft, and clutch operating means comprising a pivoted sleeve, a lever axially slidable in the sleeve and pivoted arms engaging the two clutches, the arms being so associated with the lever that an axial movement of said lever simultaneously operates both clutches and a pivotal movement selectively operates the clutches.

9. In a tractor, a driven shaft, a pair of traction wheels, a clutch for each wheel adapted to operatively connect it to the driven shaft, and clutch operating means comprising a pivoted sleeve, a lever axially in the sleeve and having a reduced portion thereon, pivoted arms engaging the two clutches having portions adapted to engage the clutch lever, axial movement of the lever serving to operate the clutches by moving the arms into or out of the reduced portion and pivotal movement of the lever serving to selectively operate the clutches by moving one of the arms.

Signed at Chicago, Illinois, this 24th day of May, 1920.

BENJAMIN S. PFEIFFER.